(12) United States Patent
Shah et al.

(10) Patent No.: US 8,494,154 B2
(45) Date of Patent: Jul. 23, 2013

(54) CRYPTOGRAPHIC IGNITION KEY SYSTEM

(75) Inventors: Sanket J. Shah, Clifton, NJ (US);
Michael K. Weller, Stroudsburg, PA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 128 days.

(21) Appl. No.: 13/134,887

(22) Filed: Jun. 20, 2011

(65) Prior Publication Data

US 2012/0321076 A1 Dec. 20, 2012

(51) Int. Cl.
*H04L 9/08* (2006.01)
(52) U.S. Cl.
USPC ............................................ 380/44

(58) Field of Classification Search
USPC ................................. 380/44, 277, 278
See application file for complete search history.

(56) References Cited

U.S. PATENT DOCUMENTS

| 5,548,721 | A | * | 8/1996 | Denslow | 726/9 |
| 2004/0208316 | A1 | * | 10/2004 | Wack et al. | 380/44 |
| 2005/0172119 | A1 | * | 8/2005 | Eckhardt et al. | 713/160 |

* cited by examiner

*Primary Examiner* — Ellen Tran
(74) *Attorney, Agent, or Firm* — Watov & Kipnes, P.C.; Kenneth Watov

(57) ABSTRACT

A cryptographic ignition key system and method for managing access to sensitive or protected information using an unclassified, block-cipher-based cryptographic combiner for storing non-private information on a physical token and storing private information on another device having anti-tamper protections and safeguards.

20 Claims, 2 Drawing Sheets

CRYPTOGRAPHIC IGNITION KEY SYSTEM

STATEMENT OF GOVERNMENT INTEREST

This invention was made with United States Government support under Prime Contract No. DAAB07-02-C-F404 awarded by the Department of Defense. The United States Government has certain rights in this invention.

FIELD OF THE INVENTION

The present invention relates to cryptographic systems, and more particularly, a cryptographic ignition key system and method for managing access to sensitive or protected information.

BACKGROUND OF THE INVENTION

Cryptographic systems are well known in the art. However, a major problem in the art is that only classified implementations exist to lock and unlock access to a cryptographic device.

The present invention solves this problem.

SUMMARY OF THE INVENTION

The present invention relates to a cryptographic ignition key system using an unclassified, block-cipher-based cryptographic combiner for storing non-private information on a physical token, and storing private information on another device having anti-tamper protections and safeguards.

In one aspect of the present invention there is provided a method for managing access to sensitive or protected information stored on a system, which comprises:
  randomly generating a first key split;
  randomly generating at least one second key split;
  encrypting the sensitive or protected information with a master key;
  encrypting the master key via a cryptographic combiner using the first and each one of the at least one second key splits as inputs to generate a corresponding third key split in the form of an encrypted master key; and
  storing each of the at least one second key split in a corresponding cryptographic ignition key retained by an authorized user.

In another aspect of the present invention there is provided a system for managing access to sensitive or protected information stored thereon, which comprises:
  a random number generator;
  an input device for receiving and operatively engaging a cryptographic ignition key;
  a secure memory; and
  a central processor operatively connected to the random number generator, the input device and the secure memory, said central processor being programmed to perform the steps of:
    randomly generating a first key split via the random number generator;
    randomly generating at least one second key split via the random number generator;
    encrypting the sensitive or protected information with a master key;
    encrypting the master key via a cryptographic combiner using the first and one of the at least one second key splits as inputs to generate a third key split in the form of an encrypted master key;
    storing the first and third key splits in the secure memory; and
    storing each of the at least one second key split in a corresponding cryptographic ignition key retained by an authorized user through the input device.

BRIEF DESCRIPTION OF THE DRAWINGS

The following drawings are illustrative of embodiments of the present invention, and are not intended to limit the invention as encompassed by the claims forming part of the application.

DETAILED DESCRIPTION OF THE INVENTION

Figure 1:
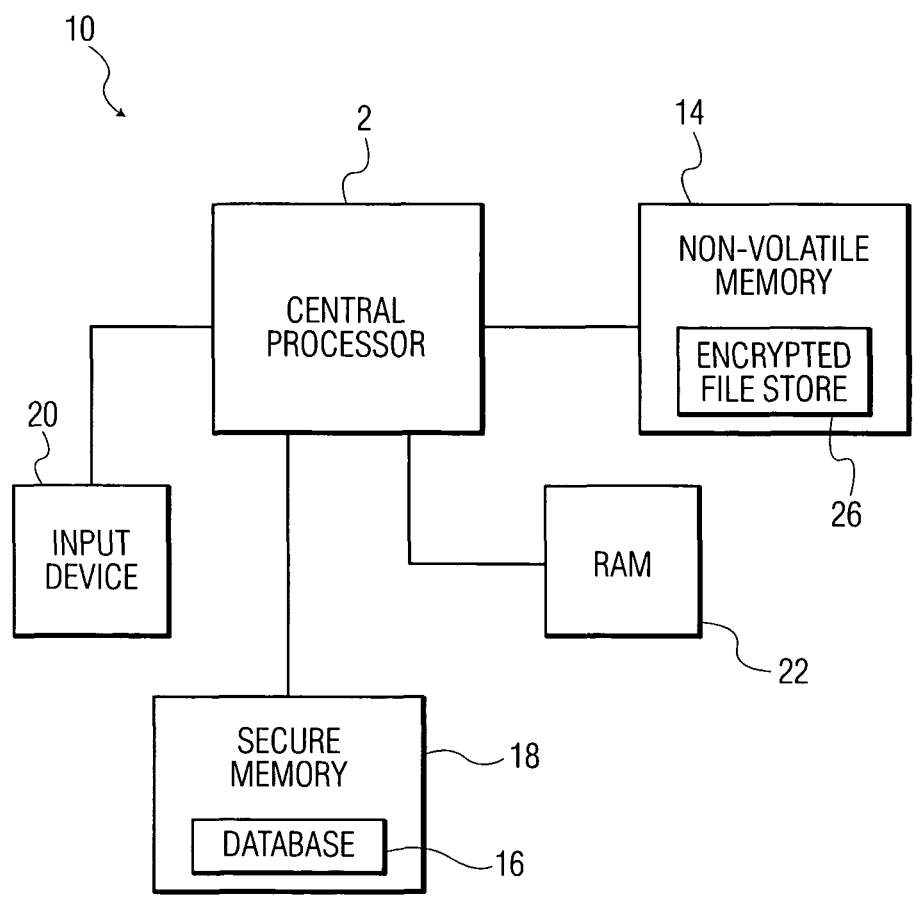
FIG. 1 is a block diagram of a cryptographic ignition key system (CIK) for one embodiment of the present invention.

Various embodiments of the invention are described using various known acronyms, and definitions thereof which are provided immediately below.

The term "cryptographic ignition key" as used herein, which has the acronym CIK, is intended to refer to a physical or electronic token used to store, transport and protect cryptographic keys and activation data for aiding authentication.

The term "non-volatile memory" as used herein is intended to refer to a memory device configured for storing data or information even in the absence of power to the device, thereby providing long-term persistent storage. Examples of non-volatile memory include flash memory, read-only memory, magnetic computer storage devices (e.g., hard disks), optical discs, and the like.

The term "master key" as used herein is intended to refer to a data string, bits, or information that determines the functional output of a cryptographic algorithm or cipher used for encrypting plaintext into ciphertext and decrypting ciphertext into plaintext.

The term "encrypted file store" as used herein is intended to refer to a database stored in a local or remote memory device, and configured for holding files, information or data encrypted by a cryptographic cipher using a master key.

The term "secure memory" as used herein is intended to refer to a memory device adapted to detect and counter against tamper events, and includes safeguards against tampering or access by unauthorized users.

The term "random access memory" as used herein is intended to refer to a memory device that can store data or information temporarily so that it is directly available to a central processor, and is used to support software activities of a user.

The term "key splits" as used herein is intended to refer to two or more separate data strings, bits or information each holding a portion of a cryptographic key (i.e., master key) that individually by themselves convey no knowledge of the whole intact cryptographic key.

The term "cryptographic combiner" as used herein is intended to refer to an algorithm utilizing a cipher (e.g., symmetric key cipher) configured for use in combination with a cryptographic key or keys (i.e., key splits) to encrypt or decrypt data or information. The cryptographic combiner can be selected from any suitable ciphers including, but not limited to, a symmetric key cipher such as a block cipher or a stream cipher, and an asymmetric key cipher such as a public key cipher.

The term "initialization vector" as used herein is intended to refer to a data string, bits or information used to randomize an encryption event and is randomly generated in association with a particular encryption key.

The term "Advanced Encryption Standard" as used herein is intended to refer to a symmetric key cipher comprising three block ciphers, each having a 128-bit block size, with key sizes of 128, 192 and 256 bits, respectively.

The term "cipher feedback" as used herein is intended to refer to a mode of operation for a block cipher to transform into a self-synchronizing stream cipher.

The term "output feedback" as used herein is intended to refer to a mode of operation for a cryptographic combiner comprising a block cipher where the block cipher is transformed into a synchronous stream cipher.

The term "cyclic redundancy check" as used herein is intended to refer to an error detecting code or integrity check code designed to detect the presence of accidental changes and errors or intentional tampering of a data string, bits or information.

The present invention is directed generally to a cryptographic ignition key system and method for managing user access to sensitive or protected information. The system of the present invention includes one or more cryptographic ignition keys (CIKs), a non-volatile memory component, a master key (MK) for gaining access to sensitive or protected information encrypted with the MK, an encrypted file store containing the MK-encrypted sensitive or protected information, a secure memory component adapted to detect and protect against tamper events, and a central processor configured for executing software utilizing a cryptographic combiner to implement the method of the present invention. The system of the present invention is designed to secure the MK in a safe and effective manner, while facilitating secure access for one or more authorized users to the MK through an individually unique CIK.

In one embodiment of the present invention, the system of the present invention utilizes two protected key splits stored in the secure memory component of the system, an unprotected key split stored in the CIK, and a cryptographic combiner for combining the corresponding key splits to retrieve the corresponding master key, thereby allowing the user to access the associated encrypted sensitive or protected information, and perform other cryptographic activities in connection with the retrieved master key (e.g., encryption). The present system is configured to generate a plurality of individually unique CIKs associated with a particular MK. Each CIK is distributed to an authorized user for access to the corresponding master key, which can be subsequently used in cryptographic applications.

Referring to FIG. 1, a cryptographic ignition key system (referred hereinafter as "system") identified generally by reference numeral 10, is shown for one embodiment of the present invention. The system 10 is adapted for managing access to sensitive or protected information, which can be stored locally or remotely therefrom. The system 10 includes a central processor 12, a non-volatile memory component 14 containing an encrypted file store or database 26 for storing encrypted content (e.g., encrypted sensitive or protected information), and a secure memory component 18 configured with tamper safeguards including detection and protection. The secure memory component 18 includes a database 16 for storing a plurality of encrypted master keys as will be described hereinafter.

The system 10 further includes an input device 20 for receiving a cryptographic ignition key (CIK) provided by an authorized user to gain access, and a random access memory (RAM) component 22 for supporting the user's session activity upon gaining access to the master key (MK) and corresponding encrypted sensitive or protected information. The input device 20 can further comprise a computer workstation having a display and keyboard.

The central processor 12 is adapted for executing authentication software designed to implement the process for managing access to the sensitive or protected information in conjunction with a valid CIK as will be described hereinafter. It is noted that the present invention can be implemented as a standalone system or in combination with other conventional user authentication methods including biometric identification, password protocols, and the like. The system 10 is programmed to generate a master key (MK), which may be assigned for access to a specific user or a group of n number of users as will be further described hereinafter. In this manner, the MK allows the authorized users to gain access to encrypted sensitive and protected information encrypted by the MK, and to perform other cryptographic functions such as encrypting new data, documents, information, communications, and the like.

In one embodiment of the present invention, the central processor 12 generates a first key split ($R_k$) corresponding to a particular MK through a random number generator such as, for example, a deterministic random bit generator or a hardware random number generator. The first key split ($R_k$) is stored in the secure memory component 18 for subsequent use as a key in a CIK combiner or MK cryptographic combiner 24 (see FIG. 2). The central processor 12 then generates through the random number generator one or more second key splits or Initialization Vectors ($R_{IV}$, wherein IV is 1 to n corresponding to the number of authorized users assigned to accessing the particular MK) associated with the MK.

Each of the second key splits ($R_{IV}$) is used in combination with the first key split ($R_k$) and the CIK combiner 24 for encrypting the MK to yield one version of the encrypted MK ($E_{RkRIV}(MK)$). The encrypted MK ($E_{RkRIV}(MK)$) serves as a third key split unique to the corresponding second key split ($R_{IV}$). Each of the second key splits ($R_{IV}$) is electronically stored in the memory component of a corresponding cryptographic ignition key assigned to an authorized user. The resulting encrypted MK ($E_{RkRIV}(MK)$) versions are stored in the database 16 of the secure memory component 18.

In a further embodiment of the present invention, the second key split ($R_{IV}$) and the third key split ($E_{RkRIV}(MK)$) can each further include an index code (ID) associated therewith to facilitate matching of the corresponding key splits with another in the subsequent MK retrieval process. In this manner, each version of the encrypted MK and associated second key split, $R_{IV}$, are assigned a corresponding identification or index code for correlation purposes. Optionally, the first key split ($R_k$), the second key split ($R_{IV}$), and the third key split ($E_{RkRIV}(MK)$) can further be assigned, respectively, with cyclic redundancy check (CRC) codes for purposes of detecting the presence of any errors or tampering in the respective key splits.

In one example, the first key split ($R_k$) stored in the secure memory component 18 can have the following bit format ($R_k$+CRC). The second key split stored in the memory of an associated CIK can have the following format ($R_1$+CRC+Role 1 ID). The third key split stored in the database 16 of the secure memory component 18 can have the following format (($E_{RkR1}(MK)$+CRC+Role 1 ID).

An illustrative example of the data string or bit format of second key splits ($R_{IV}$) where IV is 1 to 4 representing four unique tokens, each electronically stored in the memory of a corresponding CIK is shown below in Table 1.

TABLE 1

| CIK | Second Key Split ($R_{IV}$) | $R_{IV}$ bit format |
|---|---|---|
| User 1 | $R_1$ | 128 bit $R_1$ + 32 bit CRC + 4 bit ID (i.e., 0001) |
| User 2 | $R_2$ | 128 bit $R_2$ + 32 bit CRC + 4 bit ID (i.e., 0010) |
| User 3 | $R_3$ | 128 bit $R_3$ + 32 bit CRC + 4 bit ID (i.e., 0011) |
| User 4 | $R_4$ | 128 bit $R_4$ + 32 bit CRC + 4 bit ID (i.e., 0100) |

An illustrative example of the data string or bit format for four third key splits ($E_{RkRIV}(MK)$) each corresponding to an associated second key split ($R_N$) is shown below in Table 2.

TABLE 2

| $R_{IV}$ | Third Key Split ($E_{RkRIV}(MK)$) | $E_{RkRIV}(MK)$ bit format |
|---|---|---|
| $R_1$ | $E_{RkR1}(MK)$ | $E_{RkR1}(MK)$ + 32 bit CRC + 4 bit ID (i.e., 0001) |
| $R_2$ | $E_{RkR2}(MK)$ | $E_{RkR2}(MK)$ + 32 bit CRC + 4 bit ID (i.e., 0010) |
| $R_3$ | $E_{RkR3}(MK)$ | $E_{RkR3}(MK)$ + 32 bit CRC + 4 bit ID (i.e., 0011) |
| $R_4$ | $E_{RkR4}(MK)$ | $E_{RkR4}(MK)$ + 32 bit CRC + 4 bit ID (i.e., 0100) |

Figure 2:
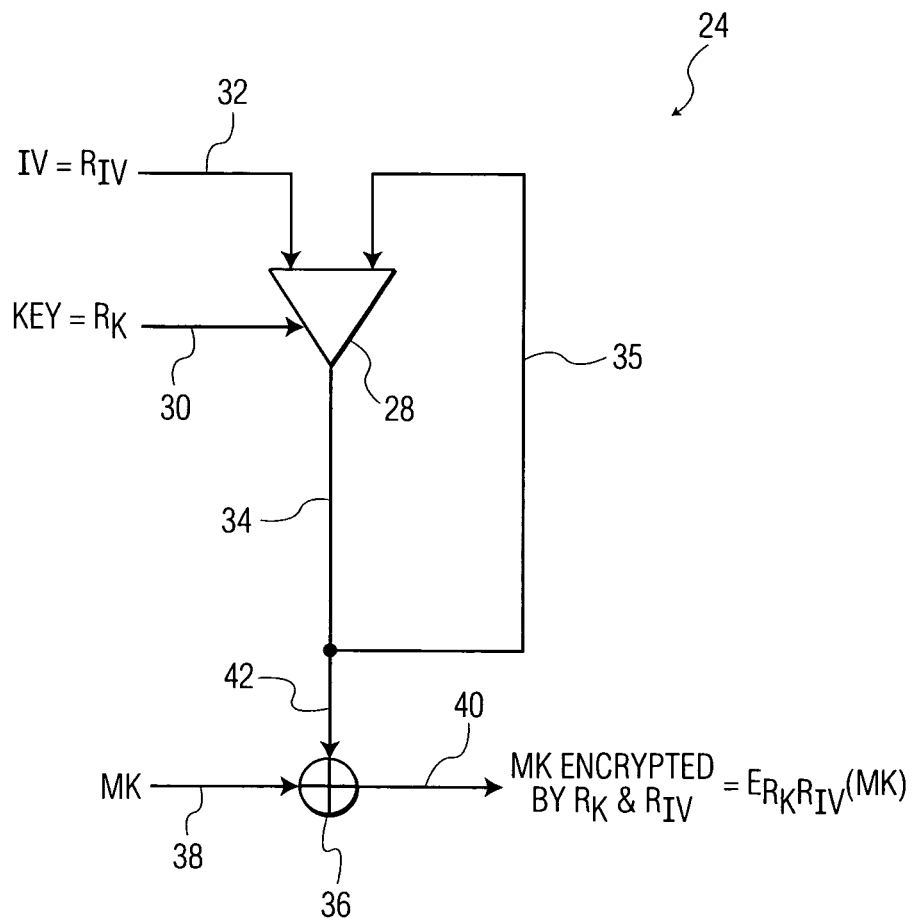
FIG. 2 is a schematic representation of a master key cryptographic combiner utilized in the present CIK system in accordance with the present invention.

Referring to FIG. 2, a schematic representation of a master key cryptographic combiner 24 utilizing an encryption cipher 28 is shown for one embodiment of the present invention. In the present embodiment, the encryption cipher 28 is a symmetric-key cipher or encryption standard selected from a block cipher. A suitable example of a block cipher is the Advanced Encryption Standard (AES)-based 128-bit block cipher. The cryptographic combiner 24 is configured for operating the encryption cipher 28 in an output feedback (OFB) mode, or alternatively in a cipher feedback (CFB) mode (not shown). It is noted that the cryptographic combiner 24 is not limited to the example described herein, and can be selected from any cryptographic combiners using suitable ciphers and modes as known to those skilled in the art.

The encryption cipher 28 of the cryptographic combiner 24 includes a first key split input 30 for receiving the first key split (Rk), a second key split input 32 for receiving the second key split ($R_{IV}$), and a key stream block output 34. An output feedback 35 is provided for this particular combiner 24. The key stream block output 34 feeds into a first input 42 of an exclusive-or (XOR) gate 36, which is generally an artifact of the specific mode of the cipher 28. The XOR gate 36 includes a second input 38 for receiving the MK to encrypt, and an output 40 for yielding the corresponding encrypted MK as the third key split ($E_{RkRIV}(MK)$).

Accordingly, the MK is encrypted through the cryptographic combiner 24 using the first key split ($R_k$) and second key split ($R_{IV}$) to yield the third key split (referred hereinafter as encrypted MK or $E_{RkRIV}(MK)$, wherein IV is 1 to n). This process is repeated for each first key split up to n to generate a corresponding series of encrypted MK. The generated series of encrypted MK are stored in the database 16 (see FIG. 1). The first key split, $R_k$, is stored in the secure memory component 18, and the second key splits ($R_{IV}$) are stored in the memory component of a corresponding CIK.

It is noted that the present invention is not limited to the assignment of key splits described herein, and can encompass other key split assignments necessary for implementing the functions of the present invention. For example, the roles of $R_k$ and $R_{IV}$ as key splits can be interchanged, or the encrypted MK can be stored on the CIK token and the corresponding $R_{IV}$ stored in the secure memory component 18.

The process for retrieving the MK can be performed by inputting the third key split through the second input 38 of the XOR gate 36, while inputting the corresponding first and second key splits ($R_k$ and $R_{IV}$) into the respective inputs 30 and 32 of the encryption cipher 28. Since the second key split ($R_{IV}$) is stored in the CIK, the retrieval of the MK can only be accomplished when the user inserts the corresponding CIK into the input device 20.

The central processor 12 reads the second key split ($R_{IV}$) (e.g., $R_3$) from the CIK along with the associated index (ID) and CRC. The central processor 12 checks the CRC to ensure the second key split ($R_{IV}$) was not corrupted or tampered. The central processor 12 then calls up the first key split ($R_k$) along with the associated CRC from the secure memory component 18. The central processor 12 checks the CRC to ensure the first key split ($R_k$) was not corrupted or tampered.

The central processor 12 calls up the associated third key split or the encrypted form of the MK ($E_{RkRIV}(MK)$) along with the associated index (ID) and CRC from the database 16 of the secure memory component 18. The central processor 12 checks the CRC to ensure the third key split ($E_{RkRIV}(MK)$) was not corrupted or tampered. The ID codes of the second key split ($R_{IV}$) and the associated third key split or the encrypted form of the MK ($E_{RkRIV}(MK)$) must correlate to one another. The central processor 12 proceeds to decrypt the corresponding encrypted form of the MK using the first and second key splits through the cryptographic combiner 24 to yield the corresponding MK.

The central processor 12 stores the retrieved MK on the RAM component 22 for operational use by the authorized user presenting the valid CIK at the input device 20. In this manner, the authorized user can access the associated encrypted files and documents stored in the encrypted file store 26 using the retrieved MK. Once the user removes the CIK from the input device 20, the system 10 clears the sensitive or protected information and master key in the RAM component 22, and ends the user's session.

In an optional step of the present invention, the central processor 12 can be programmed to generate a new second key split ($R_{IV}$) for the user after authentication, recalculates the CRC and stores a second key split ($R_{IV}$) with the appropriate CRC and index code (ID) in the CIK. The first key split ($R_k$) and the new second key split ($R_{IV}$) are used to encrypt the MK to generate a new third key split or the encrypted form of the MK ($E_{RkRIV}(MK)$). The new encrypted form of the MK ($E_{RkRIV}(MK)$) is stored in the database 16 of the secure memory component 18, and replaces the old encrypted MK. Once the user removes the CIK from the input device 20, the system 10 clears the sensitive or protected information and master key in the RAM component 22, and ends the user's session.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for managing access to sensitive or protected information stored on a system, comprising:
   randomly generating a first key split;
   randomly generating at least one second key split;
   encrypting said sensitive or protected information with a master key;
   encrypting the master key via a cryptographic combiner using the first and each one of said at least one second key splits as inputs to generate a corresponding third key split in the form of an encrypted master key; and storing each of said at least one second key split in a corresponding cryptographic ignition key retained by an authorized user.

2. The method of claim 1, comprising storing the first and third key splits in a secure memory of the system.

3. The method of claim 2, further comprising:
retrieving the second key split from the cryptographic ignition key;
retrieving the first key split and the third key split associated with the second key split from the secure memory; and
decrypting the third key split via the cryptographic combiner using the first key split and the corresponding second key split as inputs to generate the master key for use by the authorized user.

4. The method of claim 3, further comprising:
randomly generating a new second key split;
encrypting the master key via the cryptographic combiner using the first key split and the new second key split as inputs to generate a new third key split in the form of a new encrypted master key;
storing the new third key split in the secure memory; and
storing the new second key split in the cryptographic ignition key.

5. The method of claim 1, comprising assigning an index code to the second key split and the corresponding third key split for facilitating correlation therebetween.

6. The method of claim 1, comprising assigning integrity check codes to the first, second and third key splits to ensure integrity of data from corruption or tampering.

7. The method of claim 6, comprising checking the integrity check codes of at least one of the first key split, second key split and corresponding third key split to determine whether any corruption or tampering of the data contained therein has occurred.

8. The method of claim 1, wherein the cryptographic combiner comprises an asymmetric key cipher.

9. The method of claim 1, wherein the cryptographic combiner comprises a symmetric key cipher.

10. The method of claim 9, wherein the symmetric key cipher is selected from a group consisting of a block cipher, a stream cipher and combinations thereof.

11. The method of claim 10, wherein the block cipher is an Advanced Encryption Standard 128-bit output feedback mode.

12. The method of claim 1, wherein each of the at least one second key split is a randomly generated initialization vector.

13. A system for managing access to sensitive or protected information stored thereon, comprising:
a random number generator;
an input device for receiving and operatively engaging a cryptographic ignition key;
a secure memory; and
a central processor operatively connected to the random number generator, the input device and the secure memory, said central processor being programmed to perform the steps of:
randomly generating a first key split via the random number generator;
randomly generating at least one second key split via the random number generator;
encrypting said sensitive or protected information with a master key;
encrypting the master key via a cryptographic combiner using the first and each one of said at least one second key splits as inputs to generate a corresponding third key split in the form of an encrypted master key;
storing the first and third key splits in the secure memory; and
storing each of said at least one second key split in a corresponding cryptographic ignition key retained by an authorized user through said input device.

14. The system of claim 13, wherein the central processor is programmed to perform the steps of:
retrieving the second key split from the cryptographic ignition key through the input device;
retrieving the first key split and the third key split associated with the second key split from the secure memory; and
decrypting the third key split via the cryptographic combiner using the first key split and the corresponding second key split as inputs to generate the master key for use by the authorized user.

15. The system of claim 14, wherein the central processor is further programmed to perform the steps of:
randomly generating a new second key split through the random number generator;
encrypting the master key via the cryptographic combiner using the first key split and the new second key split as inputs to generate a new third key split in the form of a new encrypted master key;
storing the new third key split in the secure memory; and
storing the new second key split in the cryptographic ignition key.

16. The system of claim 13, wherein the cryptographic combiner comprises an asymmetric key cipher.

17. The system of claim 13, wherein the cryptographic combiner comprises a symmetric key cipher.

18. The system of claim 17, wherein the symmetric key cipher is selected from a group consisting of a block cipher, a stream cipher and combinations thereof.

19. The system of claim 18, wherein the block cipher is an Advanced Encryption Standard 128-bit output feedback mode.

20. A method for managing access to sensitive or protected information stored on a system, comprising:
randomly generating a first key split;
randomly generating at least one second key split;
encrypting said sensitive or protected information with a master key;
encrypting the master key via a cryptographic combiner using the first and each one of said at least one second key splits as inputs to generate a corresponding third key split in the form of an encrypted master key;
storing each of said at least one second key split in a corresponding cryptographic ignition key retained by an authorized user;
storing the first and third key splits in a secure memory of the system;
retrieving the second key split from the cryptographic ignition key;
retrieving the first key split and the third key split associated with the second key split from the secure memory; and
decrypting the third key split via the cryptographic combiner using the first key split and the corresponding second key split as inputs to generate the master key for use by the authorized user.

* * * * *